(12) United States Patent
Sahinoglu

(10) Patent No.: US 6,853,848 B2
(45) Date of Patent: Feb. 8, 2005

(54) METHOD AND SYSTEM FOR CLASSIFYING MOBILE TERMINALS

(75) Inventor: Zafer Sahinoglu, Clifton, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 425 days.

(21) Appl. No.: 10/175,530

(22) Filed: Jun. 20, 2002

(65) Prior Publication Data
US 2004/0203861 A1 Oct. 14, 2004

(51) Int. Cl.⁷ .............................................. H04Q 7/20
(52) U.S. Cl. ................................................... 455/456.1
(58) Field of Search .......................... 455/456.1, 456.3, 455/456.5, 457, 414.2; 342/450, 451; 340/992, 993, 994

(56) References Cited

U.S. PATENT DOCUMENTS 6,556,943 B2 * 4/2003 Kuwahara et al. .......... 702/150
2003/0224741 A1 * 12/2003 Sugar et al. ............. 455/115.1

* cited by examiner

Primary Examiner—Lee Nguyen
Assistant Examiner—Sanh Phu
(74) Attorney, Agent, or Firm—Dirk Brinkman; Andrew J. Curtin

(57) ABSTRACT

A method classifies a mobile terminal by a-periodically obtaining locations of the mobile terminal. Location update intervals are determined from update times associated with the locations. Frequency characteristics are generated from the location update intervals, and a probability distribution function is generated from the location update interval. Then, the mobile terminal is classified according to the frequency characteristics and the probability distribution function.

7 Claims, 5 Drawing Sheets

METHOD AND SYSTEM FOR CLASSIFYING MOBILE TERMINALS

FIELD OF THE INVENTION

This invention relates in general to location aware services, and more particularly to delivering location aware services according to mobility classifications of mobile terminals.

BACKGROUND OF THE INVENTION

Location aware services adapt and deliver services and multimedia content according to users locations and users profiles. Users of mobile terminals can generally be classified as a pedestrian, highway vehicle driver, and urban vehicle driver, see Catovic et al., "*Geolocation Updating Scheme For Location Aware Services in Wireless Networks*," Proc. MobiCom'01, 2001. Other classifications are also possible.

In the prior art, terminal mobility has been modeled by using two-dimensional Brownian motion with drift. The average speed and speed variation are input parameters for modeling each 2D-Brownian mobility motion as described by Tekinay, "*Modeling and Analysis of Mobile Cellular Networks with Highly Mobile Heterogeneous Traffic Sources*," Ph.D. dissertation, School of Information Technology and Engineering, George Mason University, Virginia, 1994, Rose et al., "*Location Uncertainty in Mobile Networks. A Theoretical Framework*," IEEE Communications Magazine, February 1997, Lei et al., "*Probability Criterion Based Location Tracking Approach for Mobility Management of Personal Communications Systems*," IEEE 0-7803-4198-8/97 and Lei et al., "*Wireless Subscriber Mobility Management Using Adaptive Individual Location Areas for PCS Systems*," IEEE 0-7803-4788-9/98.

It is desired to classify the mobility characteristics of mobile terminals, and to adapt and deliver location aware services according to the mobile terminal characteristics.

SUMMARY OF THE INVENTION

A method classifies a mobile terminal by a-periodically obtaining locations of the mobile terminal.

Location update intervals are determined from update times associated with the locations.

Frequency characteristics are generated from the location update intervals, and a probability distribution function is generated from the location update interval.

Then, the mobile terminal is classified according to the frequency characteristics and the probability distribution function.

DETAILED DESCRIPTION OF PREFERRED EMBODIMENTS

The present invention provides a system and method for classifying mobile terminals, and for customizing and delivering location aware services (LAS) according to mobile terminal classifications. Mobile terminals determine their locations, and a service manager polls this location information so that an application service provider can adapt and deliver personalized and general multimedia services according different classes of mobile terminals.

System Diagram

Figure 1:
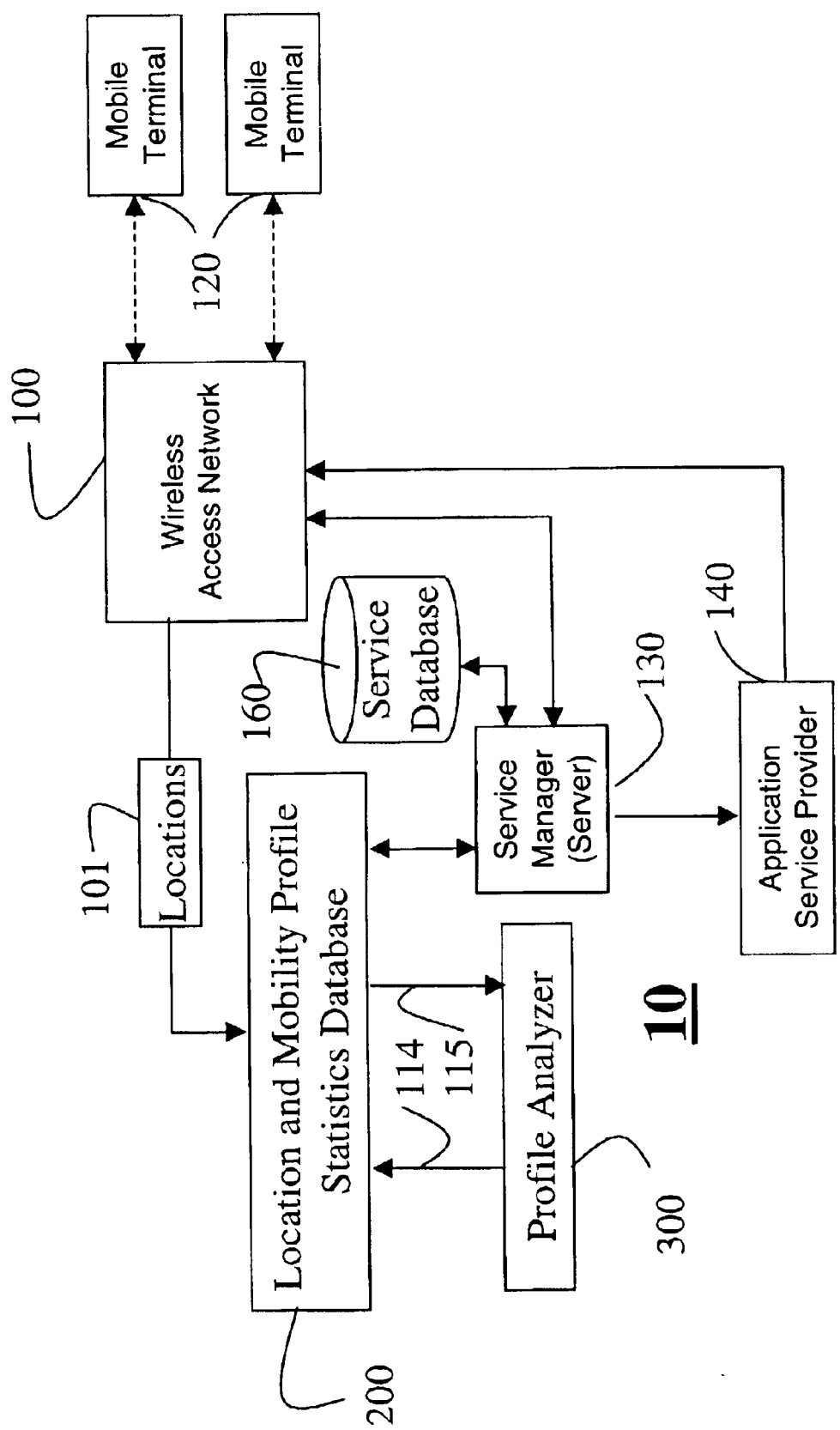
FIG. 1 is a block diagram of the location aware system with mobility profiles according to the invention.

FIG. 1 shows a location aware system and method 10 according to the invention. The system 10 includes mobile terminals (MT) 120, e.g., cellular phones and portable computing devices. The MTs 120 are connected to a service manager (server) 130 and an application service provider (ASP) 140 via an access network 100. The access network can include wired and wireless portions. There can be multiple ASPs, e.g., local businesses in a particular locale. The services, e.g., multimedia content, to be provided can be stored in a service database 160. Locations 101 of the mobile terminals 120 can be determined by using any location service, e.g., GPS or see U.S. Pat. No. 5,970,414 issued to Bi et al. on Oct. 19, 1999, entitled, "*Method for estimating a mobile-telephone's location*." Typically, the location service is part of the network 100. The locations 101 and location update intervals are stored in a location and mobility profile statistics database 200, see FIG. 2 for details, which can be part of the network 100, the service manager 130, or the application service provider 140.

Figure 3:
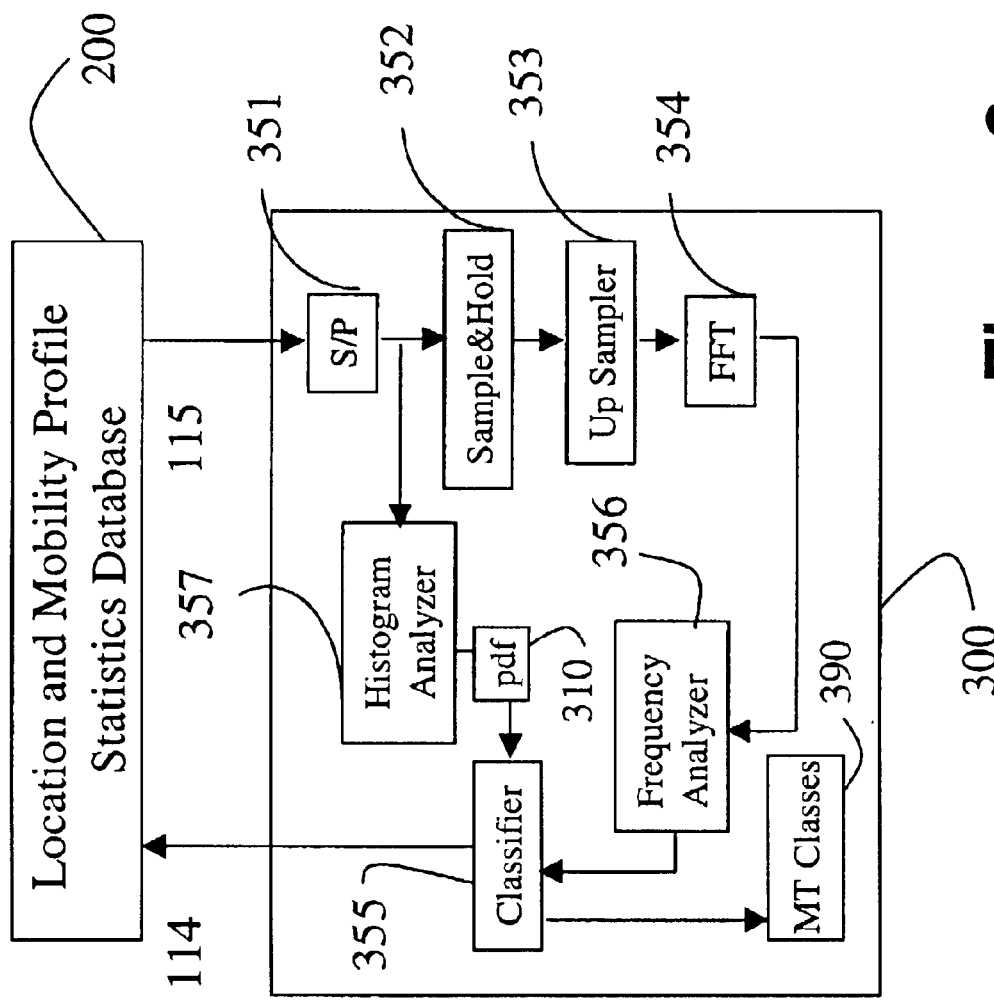
FIG. 3 is a block diagram of a mobility profile analyzer for detecting the mobility profile of a mobile terminal by using statistical signal processing tools.

A profile analyzer 300, see FIG. 3, performs statistical signal processing on a history of location update intervals stored in the database 200 to determine the mobility profiles of the MTs 120. The mobility profiles allow one to classify different types of mobile terminal users, e.g., pedestrian, bicycler, urban driver, or highway driver.

The profile analyzer 300 a-periodically updates the mobility profiles in the database 200. The service manager 130 polls the location information and the mobility profiles of the MTs 120, and customizes the services 160 to be delivered according to the mobility profile. For example, a MT used by a pedestrian has limited battery power, unlike a mobile terminal used by a vehicle driver. Therefore, the content and rate adaptation (transcoding) is necessary to minimize energy consumption of the pedestrian's MT. The service manager 130 informs the application service provider (ASP) 140 of any MTs within the ASP's 140 proximity, and MTs' 120 mobility profiles. The ASP 140 performs the content adaptation and delivers customized services to the MTs 120.

Location and Mobility Profile Statistics Database

Figure 2:
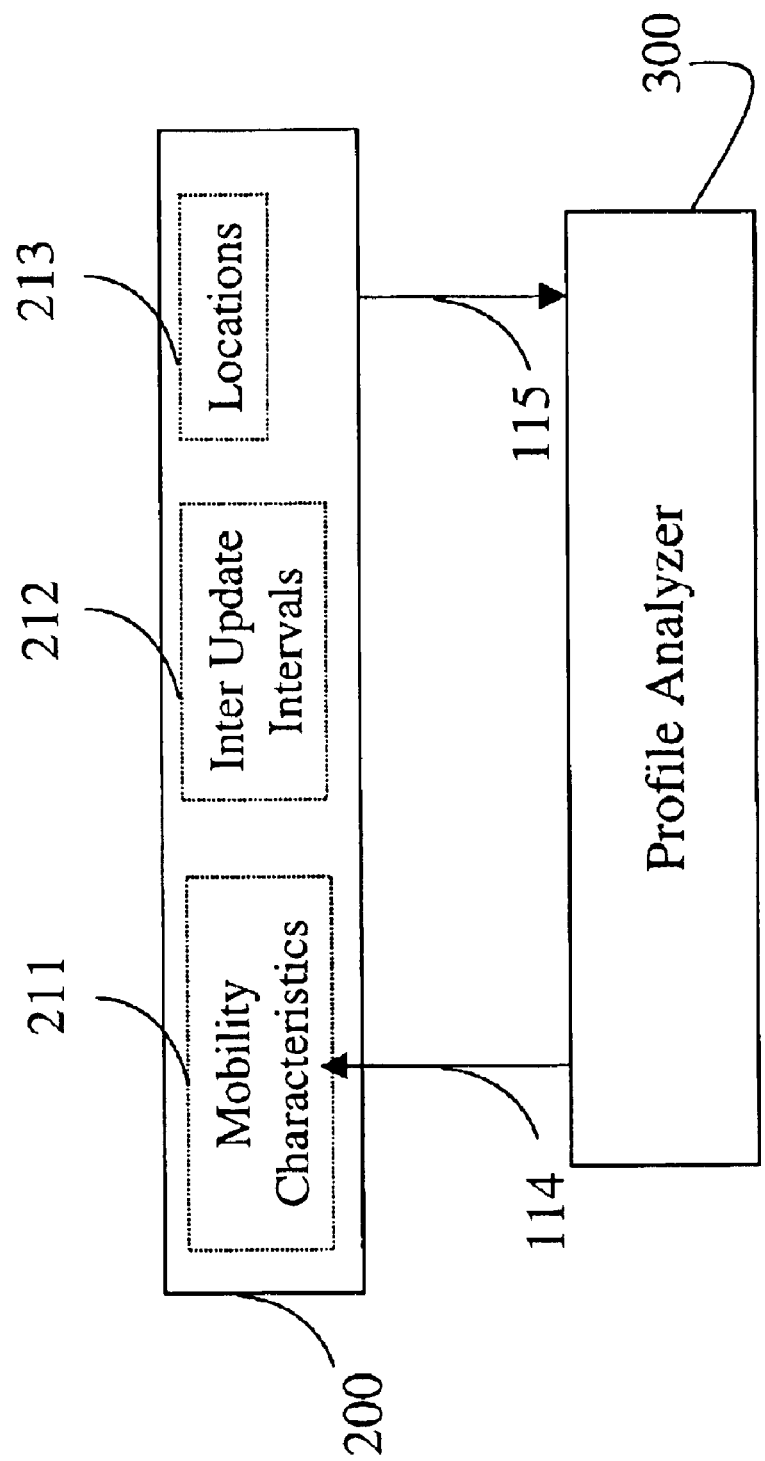
FIG. 2 is a block diagram of a location and mobility profile statistics database according to the invention.

As shown in FIG. 2, the location and mobility profile statistics database 200 comprises three basic components: a mobility characteristics database 211, an inter update intervals database 212, and a location database 213.

The profile analyzer 300 updates the mobility characteristics database 211 via lines 114–115. These updates occur in an a-periodic fashion. If the location update intervals are small, then the profile updates are done more frequently. As the location update intervals get larger, the frequency of the profile updates is also decreased. Dynamically changing the update frequency maintains preciseness in profile detection and decreases the signaling load, e.g., when there is no need to update, do not update. The mobility characteristics database 211 is accessible by the service manager 130. The frequency at which the updates are performed depends on the speed at which the mobile terminal is moving.

Location update intervals 212 are updated whenever a MT requires a location update. The network 100 performs these updates. The network also updates the location database 213 that keeps track of the locations of the MTs 120. The location database 213 is also accessible by the service manager 130.

Profile Analyzer

Figure 4:
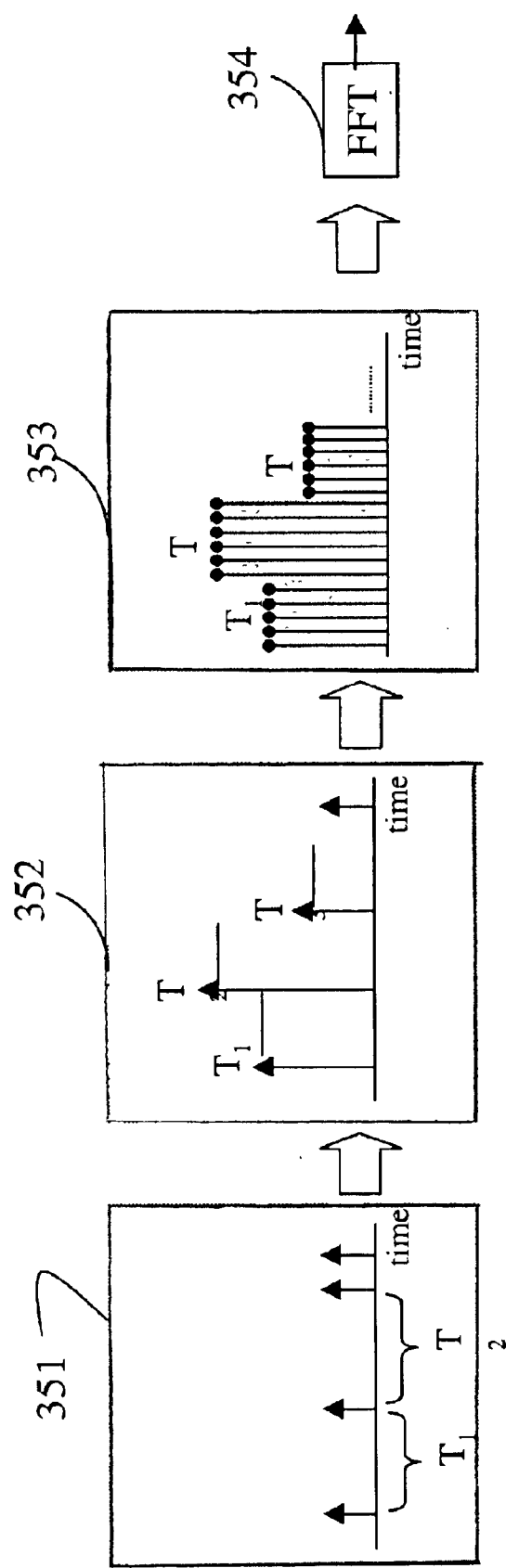
FIG. 4 is a block diagram of data flow through the profile analyzer of FIG. 3.

As shown in FIGS. 3 and 4, the profile analyzer 300 takes location update intervals 115 as an input from the statistics database 200. Serial to parallel (S/P) conversion 351 performs vector operations on the location update interval data 115 for time intervals $T_1, T_2, \ldots$, etc. The vector data are then entered into a sample&hold circuit 352. The output of the sample&hold circuit 352 is up-sampled 353.

A fast Fourier transform (FFT) operation 354 converts the up-sampled data to frequency characteristics of the location update intervals 115. The frequency characteristics are fed into the frequency analyzer 356.

A histogram 310 is produced from the output of S/P 351 by a histogram analyzer 357. The histogram approximates a probability distribution function that (pdf) that characterizes the mobility of the terminal. For example, the pdf can generally be chi-squared (non-central) for urban vehicular, and gamma for highway vehicular. The pdf 310 is entered into a classifier 355. The classifier 355 classifies the mobile terminals into classes 390 according to the pdf 310 and the analyzed frequency characteristics.

Figure 6:
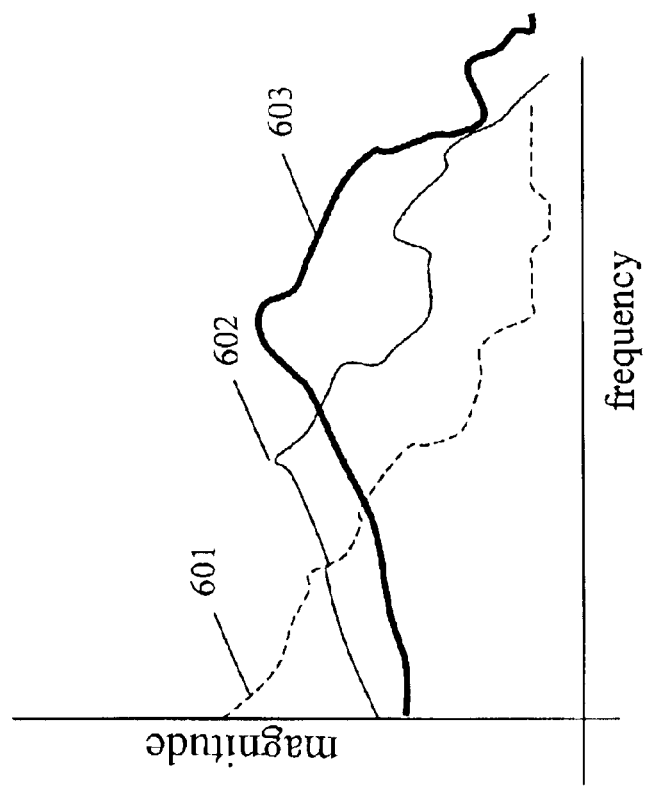
FIG. 6 is a graph of frequency spectrum characteristics of processed location update intervals for pedestrian, urban vehicle and highway vehicle drivers.
Figure 5:
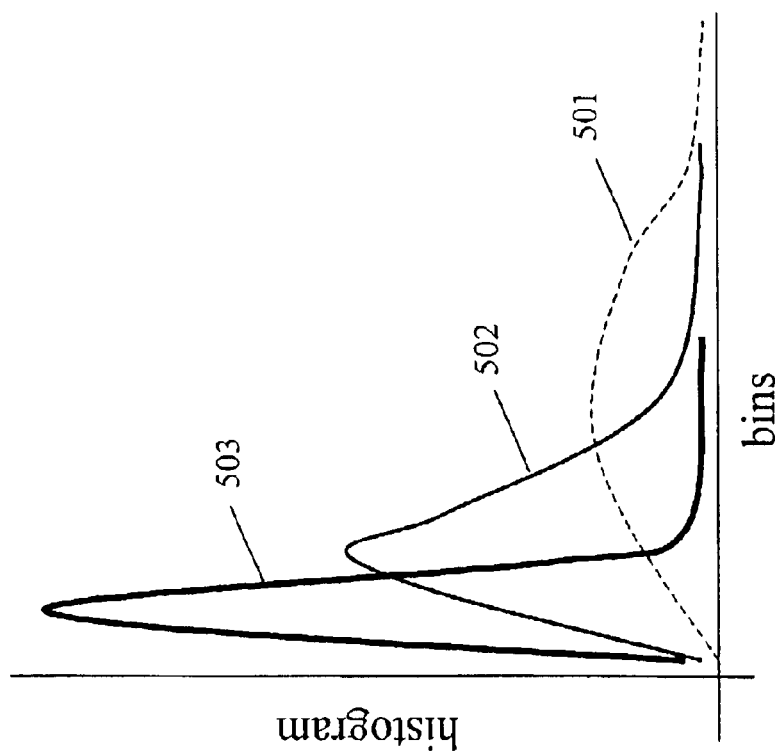
FIG. 5 is a graph of location update intervals for pedestrian, urban vehicle and highway vehicle drivers.

As shown in FIG. 5, a histogram or pdf of location update intervals for a pedestrian 501 is more spread and heavier tailed than the highway 503 and urban vehicle drivers 502. FIG. 6 shows that the frequency spectrum has relatively higher energies at relatively low frequencies for a slow moving pedestrian 601, at middle frequencies for an urban vehicle driver 602, and at high frequencies for a highway vehicle driver 603.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for classifying a mobile terminal, comprising:

a-periodically obtaining locations of the mobile terminal;

determining location update intervals from update times associated with the locations;

generating frequency characteristics from the location update intervals;

generating a probability distribution function from the location update intervals; and classifying the mobile terminal according to the frequency characteristics and the probability distribution function.

2. The method of claim 1 further comprising:

converting serial location update intervals to parallel location update intervals;

sampling and holding the parallel location update intervals as samples;

upsampling the sample; and transforming the samples into the frequency characteristics.

3. The method of claim 1 wherein the transform is a fast Fourier transform.

4. The method of claim 1 further comprising:

adapting and delivering location aware services according to the classification of the mobile terminal.

5. The method of claim 1 wherein the locations are obtained via a network.

6. The method of claim 1 wherein the mobile terminal is classified as pedestrian, urban driver, or highway driver.

7. The method of claim 1 wherein a frequency of obtaining the locations depends on a speed at which the mobile terminal is moving.

* * * * *